(No Model.)
G. E. BARTHOLOMEW.
CARRIAGE GEAR.
No. 265,001. Patented Sept. 26, 1882.
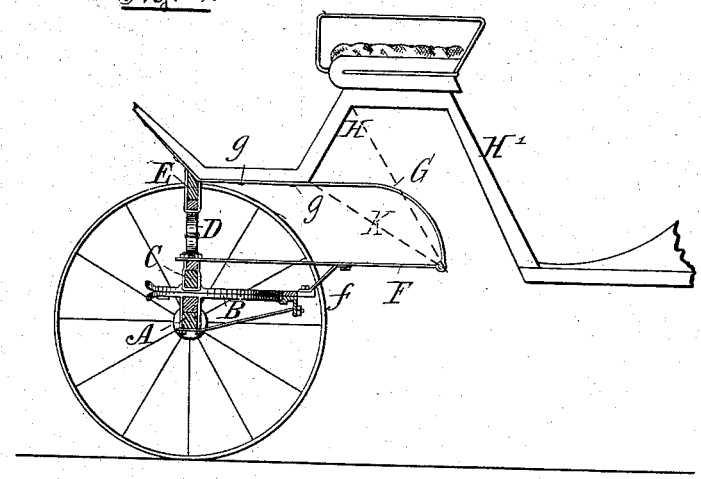
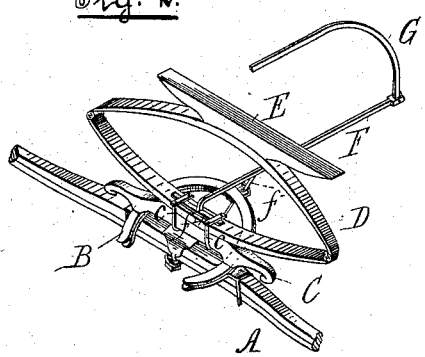
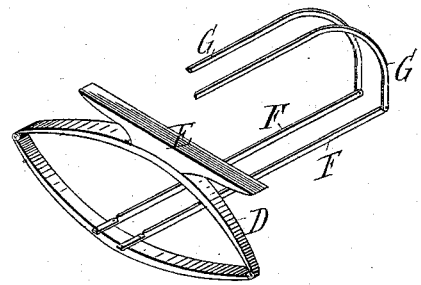
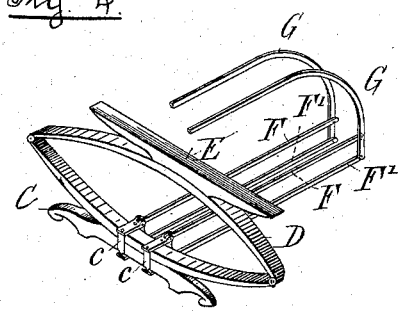
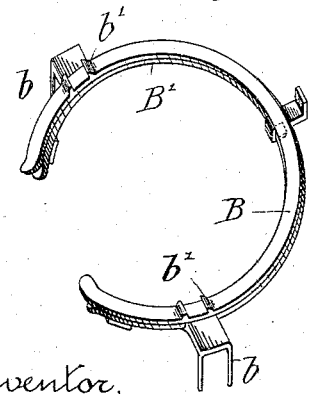
Witnesses:
Inventor.
G. E. Bartholomew

UNITED STATES PATENT OFFICE.

GEORGE E. BARTHOLOMEW, OF MONTREAL, QUEBEC, CANADA, ASSIGNOR OF ONE-HALF TO EDMOND ARMANT, OF SAME PLACE.

CARRIAGE-GEAR.

SPECIFICATION forming part of Letters Patent No. 265,001, dated September 26, 1882.

Application filed May 19, 1882. (No model.)

*To all whom it may concern:*

Be it known that I, GEORGE EUGENE BARTHOLOMEW, formerly of the town of Sheffield, in the State of Massachusetts, but at present residing in the city of Montreal, in the district of Montreal and Province of Quebec, Canada, have invented certain new and useful Improvements in Carriage-Gears; and I do hereby declare that the following is a full, clear, and exact description of the same.

My invention relates to improvements in that class of carriage-gear in which the perch connecting the front and rear axles is done away with, and where the springs are braced to the carriage-body.

Heretofore brace-bars have been connected at one end to the spring-gear, axle, or fifth-wheel and at the other directly to the under side of the carriage-body, their ends being generally out of line with each other—that is to say, the brace-bars have been arranged in an angular position—which arrangement is very objectionable on account of the liability of the spring to roll and the inner side of the fifth-wheel to cant downward as the spring is depressed from not being properly braced. Now, my invention is designed to brace the spring firmly, so as to prevent any but a very slight backward roll; to properly support the fifth-wheel, and insure its easy and accurate movement; to afford a strong resistance to all unnatural draft, and to allow the front wheels of the vehicle to turn completely under the arch or frame of the vehicle without in any way interfering with the easy working of the parts, besides materially lessening the cost and labor involved, and producing a stronger, lighter, and more symmetrical vehicle than heretofore.

My invention consists, broadly, in the combination, with a carriage-spring and one or more straight couplings, of draw-bars or equivalent means connected to the under side of the carriage-body, and to said couplings at a point below said carriage-body and near the line of draft; but for more complete comprehension of the same reference must be had to the annexed drawings, where—

Figure 1 is a view of part of a carriage-body illustrating my invention, the spring and axle being in section; Fig. 2, a perspective view, showing one way of carrying out my invention; Figs. 3 and 4, similar views, showing modifications of the same; and Fig. 5, a view of the fifth-wheel which I prefer to use in connection with my invention.

Similar letters indicate like parts.

A is the axle, of any ordinary kind, to which is firmly attached, by clips $b\ b$ or other suitable devices, the lower half, B', of the fifth-wheel B. Clips $b'\ b'$, on the upper surface of the top half of the fifth-wheel, serve to hold the head-block C firmly in place thereon, to this head-block being securely fastened the under side of the spring D, by straps or clips $c\ c$ or other suitable means. The upper side of the spring is attached in any suitable or usual way to the spring-bar E, which is in turn bolted to the carriage-body H at the desired point.

F is my coupling-bar, preferably provided, as in Fig. 2, with a T-shaped front end, $f'$, which is firmly fastened to the under side of the spring D, (or it may go underneath the head-block C, if desired,) its other end being fastened (adjustably, if desired) to the downwardly-curved end of a draw-bar, G. This draw-bar is bolted or riveted to the carriage-body H, as shown at $g\ g$, and when a long draft is required projects as far back under the arch H' as will just allow the wheel to pass freely behind it; or this draw-bar may be shortened or varied in shape, according to the style of vehicle to which my invention is to be applied. Its inner end is curved or bent downward to its connection with the coupling-bar F, so as to allow the latter to be arranged nearly horizontal or parallel with the line of draft, it being thus possible, also, to arrange said bar so that it may conveniently support the inner edge of the fifth-wheel B. In Figs. 1 and 2 I have shown a small single brace, $f$, for this purpose; but it will be understood that this may be arranged to suit different styles of coupling-bars.

Although I have only thus far described a single coupling-bar F in connection with the spring D, and a single draw-bar G, it must be distinctly understood that in some cases it may be desirable to use two coupling-bars and two draw-bars in place of said single bars, Fig. 3 showing an arrangement of my invention in this manner; or even, as in Fig. 4, I may add to the double coupling-bars F F two others, (marked F' F',) which may be pivotally connected to the head-block C and to the ends of the two draw-bars G G when it is desired to greatly strengthen the same, these double bars preventing any undue roll and insuring that the spring shall always work straight up and down. These modifications and many others—such as forking the end of the single coupling-bar F (shown in Fig. 2) and attaching said forked ends to double draw-bars, &c.—are merely multiplications of each other, and any of them can be used; or a projection or hanger from the carriage-body (shown in dotted lines at K in Fig. 1) may be substituted for the draw-bars described without departing from the main principle of my invention.

I wish it also to be understood that, although an elliptic spring and a particular form of fifth-wheel have been shown in the drawings, I may use any other springs or fifth-wheel found suitable for carrying out my invention; but I reserve the right to make a separate application for patent on the construction of fifth-wheel herein shown, as it embodies certain novel features of value.

What I claim, and desire to secure by Letters Patent, is as follows:

1. The combination, with the wagon-body and the spring, of the rigid brace F, secured directly to the said spring and extending back to or beyond the center of the wagon-body, and the curved connecting-bar G, bolted rigidly to the bottom of the wagon-body and extending backward and hinged to the inner end of the said brace F, substantially as described.

2. In combination with the couplings F and fifth-wheel B, arranged as described, the short brace $f$, substantially as and for the purpose set forth.

G. E. BARTHOLOMEW.

Witnesses:
R. A. KELLOND,
J. A. RENNIE.